Nov. 21, 1939.   W. SIEBENMORGEN   2,181,076
ELECTRICAL BRUSH
Filed July 23, 1938   2 Sheets-Sheet 1
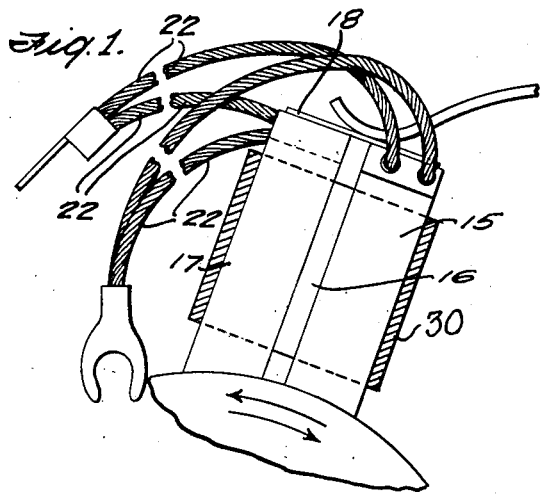
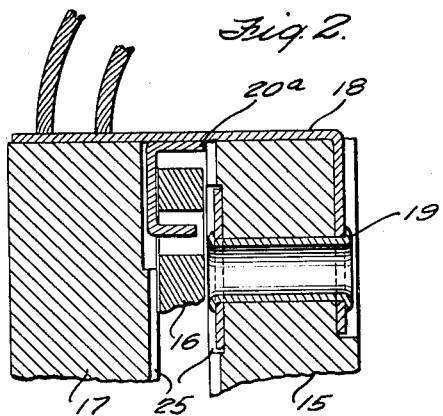
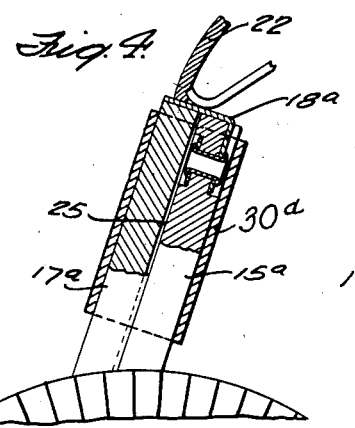
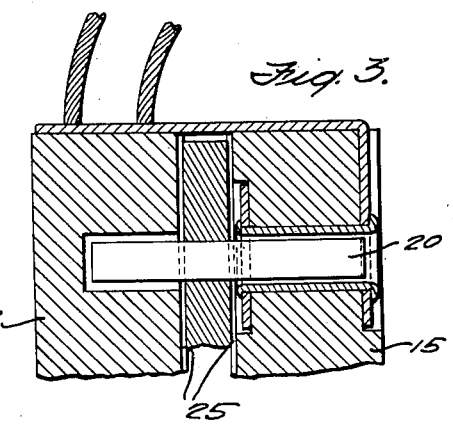
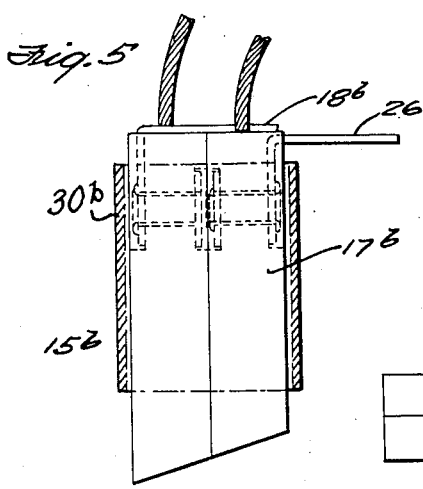
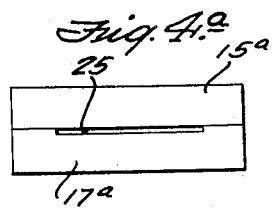
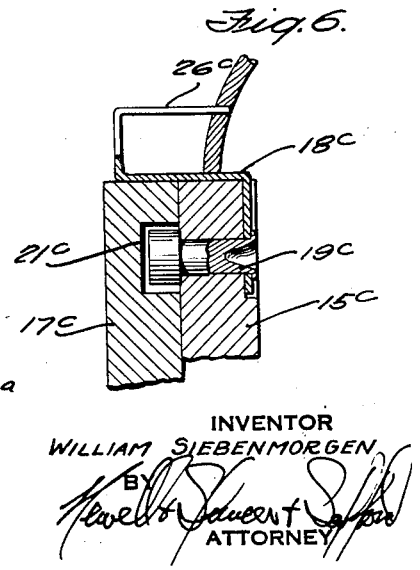
INVENTOR
WILLIAM SIEBENMORGEN
BY
ATTORNEY Nov. 21, 1939.  W. SIEBENMORGEN  2,181,076
ELECTRICAL BRUSH
Filed July 23, 1938  2 Sheets-Sheet 2
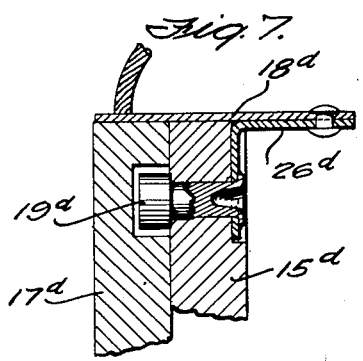
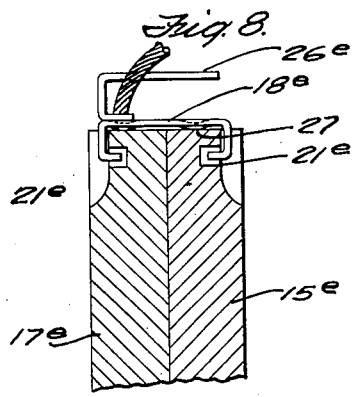
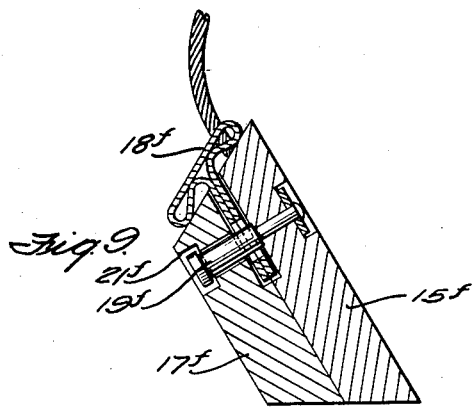
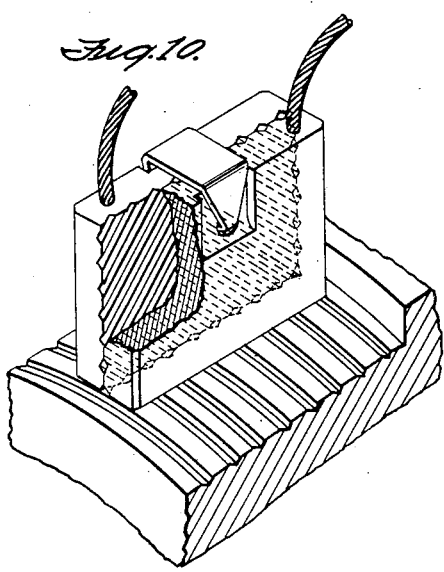
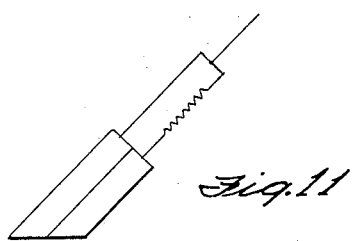
INVENTOR
WILLIAM SIEBENMORGEN
ATTORNEY Patented Nov. 21, 1939

2,181,076

UNITED STATES PATENT OFFICE 2,181,076

ELECTRICAL BRUSH

William Siebenmorgen, Westfield, N. J., assignor to Speer Carbon Company, St. Marys, Pa., a corporation of Pennsylvania Application July 23, 1938, Serial No. 220,865

16 Claims. (Cl. 171—324)

This invention relates to electrical brushes and to electrical devices in which such brushes are used. More particularly the invention relates to composite brushes made up of a plurality of layers and especially those in which the layers are separate so as to permit slight movement relative to one another toward and away from a contact surface, and are inter-connected for a joint action against the contact surface, e. g., by a pressure distributing means and to devices in which such brushes are combined.

By careful analysis of the conditions imposed upon electrical brushes in practical operation a number of important facts appear which have not been fully taken into consideration in the design and construction of brushes as commonly used prior to my invention. Thus it is known, for example, that the current density is not evenly distributed throughout the face of the brush, but is largely concentrated in a relatively small area. Under certain conditions of operation a relatively large part of the current to which the brush is subjected may be due to short-circuit current passing crosswise through the face of the brush between commutator bars. In the case of commutators which are out of round or which have high or low bars or hard spots which have worn less than other parts of the surface, the brushes do not make perfect contact at all times and especially at high speed operation may "jump" or "chatter" slightly due to the inertia of the brush. In most cases the actual electrical contact between the brush and commutator occurs only at very few minute points with a very high localized current density at those points, and this is likely to be true regardless of the area of the face of the brush, that is to say, an increased area of the brush does not necessarily give a proportional increase in the area of actual contact between the brush and the commutator.

The dividing of the brush into several layers positioned one beyond the other in the direction of movement of the commutator or ring, etc., and each pressed resiliently against the commutator, etc., results in improvements in all of these respects. Each of these smaller separate layers, if properly pressed against the commutator, finds its point or points of good contact and so may have as much actual conducting contact with the commutator as the entire brush of the larger size. Each, because of its narrower dimension in the direction of rotation of the commutator, can follow the irregularities of the commutator much more accurately than the larger brush and because of its lesser inertia will have less tendency to jump away from the commutator. Furthermore, since each of the separate layers will be acted upon separately by the irregularity of the commutator, one or more of the layers should be in contact with the commutator at all times, even through another may be pushed out of good contact by the irregularity in the commutator surface. The division of the brush longitudinally along surfaces transverse to the direction of movement of the commutator, etc., introduces a relatively high contact drop at each of the surfaces of division, thereby greatly increasing the resistance to cross currents through the brush parallel to the face of the brush and thereby reducing the heating of the brush face by short-circuiting currents between commutator bars, and thus improving commutation.

Surprisingly, I have found that the anticipated improvement is only partially attained if brushes are duplicated by mounting two brushes side by side each with its own spring for pressing it against the commutator, slip ring or other sliding contact device. I have found that if both are actuated from a single pressure spring through a pressure distributing member a very important improvement is attained and likewise if a pair of brushes each with its own spring are connected together by a clip or other pressure distributing member by which the action of each is made to some extent dependent upon that of the other the functioning of the brushes again is much improved.

It is important that there should be flexibility in the connection between the various brush sections, i. e., capacity for longitudinal movement of each toward and away from the contact surface separately and relative to one another, but this flexibility I have found should be limited; and a stiff connecting member of a resilient material, e. g., steel or other metal, rigidly secured to at least one section, gives better results than a loosely or freely flexible connection which allows one section to wear indefinitely ahead of another.

The range of movement required between the adjacent sections for the present invention is relatively small—being in general of the same order of magnitude as the irregularities of the sliding contact surface on which the brush is to operate. In general a provision for relative movement up to $\frac{1}{16}$" will be more than adequate. Moreover, the irregularities which cause such movement will, in ordinary operation, pass very rapidly under the brush so that the resulting movements are in the nature of high frequency vibrations, which even very stiff connecting clips or other pressure distributing members can accommodate; and in practice I have found it advantageous to use a clip or other such member which is so stiff and so rigidly secured to at least one of the brush sections that it does not yield appreciably under the static pressure of the spring under which it is designed to operate.

My invention may be utilized, however, with connecting clips capable of much greater movement and even with a pressure distributing member freely hinged on the section, but in such case it is important to design the pressure distributing member so as to maintain substantially the same angular relationships of the pressure on the several sections throughout normal wear, e. g., by special design of the pressure distributing member or connecting clip, by use of different composition in different sections to compensate for differences in conditions of operation so that all sections will wear at an approximately uniform rate, or by controlling the current densities in the several brush sections.

The variation in composition of the several sections may also be utilized for electrical purposes, e. g., to improve the commutation by varying the resistance of different sections, e. g., to overcome over- or under-compensation in the electric machine.

The current distribution in the various sections of the brush may be controlled by the use of composite brushes with different materials, giving different internal resistances or different contact drops or both, for different sections, or by different resistances external to the brush, e. g., in the respective shunt connections.

Likewise, the parts of the brush which carry the most current may be of composition designed for proper current conduction while other sections which carry little current or may even be insulated against current conduction, may be of a composition designed to lubricate or to clean the sliding contact surface or for other special function. It is an important advantage of my invention that I am able to carry on these special functions in a part or parts of the brush which is free from the heating effects of current flow.

Although my brushes are divided into sections and these sections may be designed and/or connected respectively to have special action, e. g., by varying the resistances of the sections or their connections, nevertheless the sections are mechanically connected together so that they are handled and operated as a unit. The simplicity of handling, installation and replacement which results from this unitary structure are important advantages of my invention, as well as the improved functioning of the brush in actual operation.

It is an object of the present invention to provide sectional brush units adapted to operate in a common holder and under a common spring such that all parts of the brush will be properly pressed against the contact surface at all times regardless of wear. It is also an object of the invention to provide a sectional brush which can be substituted in existing electrical devices for the single brushes as heretofore used, without other change in the device. It is also an object of the invention to provide a sectional brush in which the current is distributed to the various parts thereof by current lead-in conductors, and in which cross currents within the brush unit are minimized. It is an object of the invention to provide brushes adapted to the particular conditions of the electrical devices in which they are used by varying the resistance to the passage of current through the various sections of the brush and to produce the desired current distribution. It is another object of my invention to provide a unitary sectional brush which may be handled, installed and operated as a single brush, but which will have the advantages of the sectional brush, e. g., as discussed above.

Other objects and advantages of my invention will appear to those skilled in the art from the following specification and claims.

In the preferred embodiment of my invention several separate and relatively movable sections are combined with a pressure distributing member to replace a single brush or separate multiple brushes of the older constructions as used prior to my invention. The current is led into each current conducting section of this brush by means of a separate inlead connection, as for example, an ordinary pigtail connection, and thus each section may be made to carry its assigned share of the current with very little cross flow of current through the brush, this latter feature being of particular importance with brush materials which offer a relatively low resistance to cross currents as compared with longitudinal currents.

In the accompanying drawings I have shown for purposes of illustration a preferred embodiment of my invention and several modifications thereof. My invention, of course, is not to be limited to the particular forms illustrated in the drawings, but will be more readily understood by reference to these drawings in which Fig. 1 is a fragmentary view showing a slip ring brush made according to my invention in its relation to the contact ring and pressing spring shown in elevation and partly broken away;

Figs. 2 and 3 are fragmentary sectional views showing the inter-connection of the sections of the brush;

Fig. 4 is a view in longitudinal section of a commutator brush of structure similar to that shown in Fig. 1;

Fig. 4a is an end view of the same;

Fig. 5 is a view in side elevation of a brush provided with a lifting clip;

Fig. 6 is a fragmentary sectional view of a brush similar to Fig. 5, but with a different type of lifting clip;

Fig. 7 is a view similar to Fig. 6 but showing a standard lifting clip with another type of interconnection between sections;

Figs. 8 and 9 are fragmentary views in section of modified forms of the invention;

Fig. 10 is a view partly in section and partly in elevation of a ring and brush combination embodying my invention; and Fig. 11 is a diagrammatic representation of a connection for the brush.

Referring first to Fig. 1, the brush there shown consists of three sections 15, 16, 17. To the section 15 is attached a hammer plate or clip 18 which serves as a pressure distributing member to receive the pressure from the hammer spring 14, by which the brush is pressed into contact with the commutator, collector, slip ring or other sliding contact device, and to distribute it among the several sections. This hammer plate in the preferred embodiment illustrated in Fig. 1 is a steel strip substantially rigid and bent at right angles and is riveted to the section 15 as more clearly shown at 19 in Figs. 3 and 4.

The section 16 in the preferred embodiment illustrated is designed to serve as a lubricating insert and is made of a graphite composition. This preferably is also secured to the hammer plate 18, but with a limited flexibility of movement therebetween. Two alternative structures for such a connection are shown in Figs. 2 and 3 respectively. In Fig. 3 a pin or rivet 20 is inserted through the member 16 and extends on one or both sides into a larger hole or slot in which it engages one or both of the other sections 15 and 17. In the structure shown in Fig. 2 an auxiliary clip 20a is secured, e. g., by spot welding to the bottom of the hammer plate 18 and engages a hole 21 in the section 16. The section 16 may, of course, be secured in other ways or cemented to the adjacent sections.

The section 17 may be connected to the other sections or the hammer plate by similar means allowing limited flexibility for relative movement between them. In the embodiment shown in Fig. 1, however, no such connection is made but the section 17 is mechanically connected and held in a unitary structure by means of the current lead-ins 22 which are connected mechanically and electrically to the respective current conducting sections 16 and 17 and to one another.

The brush shown in this case is particularly intended for use on a slip ring and the sections 15 and 17, therefore, may be made, for example, of a pressed copper or copper-graphite composition. If the conditions of any given use are such that one section consistently wears down faster than another, this should be compensated for by using for that section a composition more resistant to wear.

In the use of this sectional unit the brush, as shown, is fitted into the ordinary brush box 30 in place of the ordinary brush; the common hammer plate 18 is engaged under the common hammer spring and the connector terminals 23 on the lead-in conductor 22 are connected to the connector terminals in the same way as with the ordinary single unit brush.

One important advantage of the construction as described results from the differences in curvature between the brush face and the sliding contact surface. This in turn may result from differences in expansion and contraction between the material of which the brushes are made and the material of which the commutator, collector ring, etc., is made. If, during the operation of the machine, these are heated to a relatively high temperature there may be a substantial variation in the curvature between the surfaces of the brush and of the sliding contact surface as the two are expanded from room temperature to operating temperature. Such differences in curvature may also result from shifting of the brush during operation so that its edges are worn away beyond the cylindrical curvature of contact surface. The effect of these differences is minimized by dividing the brush, according to the present invention, so that the arc of contact is shortened and consequently the divergence of the surfaces due to differences in curvature is reduced while the area of contact is multiplied.

As the machine operates, the irregularities in the contact surface of the slip ring, etc., or any out of round condition, may cause the brush sections to move up and down in the brush box. Since these conditions will affect first one section of the brush and then another, the result will be that the sections will move successively as the particular condition passes first under one and then under another. These movements will be relatively small and within the capacity of the hammer plate 18 to yield and also within the flexibility of the connection between the brush sections or the sections respectively and the hammer plate. However, any substantial tendency of a section to jump substantially beyond the distance required by the irregularity will meet with opposition from the other sections; and similarly any tendency of any individual brush section to vibrate at a frequency which might result in harmonic oscillations in any part of the brush or its pressure mechanism is counteracted by the out of phase condition of the other brush sections, by the friction between the several sections and by differences in mass, resulting in the different sections having different natural frequencies so that the tendency of any one to harmonic oscillation would be opposed by the others. The division of the brush into sections, moreover, results in each having only a fraction of the mass of a single unit brush and, therefore, much lower inertia which can be easily overcome by the common spring and by the friction and opposing forces from the other sections.

As a consequence of this all of the brush sections remain in contact with the slip ring, etc., for a greater portion of the time than would be possible with a single brush of ordinary design; and moreover, since the brush is divided into sections which are acted upon successively, it will ordinarily happen that if one section should under any circumstances be lifted out of contact or so as to reduce the pressure of contact, there will still remain another section in contact with the ring which can carry the current; and consequently the commutation or current conduction between the brush and the sliding contact surface will remain much more uniform throughout a complete revolution of the sliding contact surface and under varying conditions of operation than would be the case with any previously known construction.

In Fig. 4, I have shown a commutator brush which in general is similar to that shown in Fig. 1. In this case, however, the lubricating insert section 16 has been omitted and the brush consists of two conducting sections 15a and 17a. The hammer plate 18a is secured in substantially the same way as in Fig. 1 and extends over the adjacent section 17a to distribute the pressure from the spring 24 exactly as in the case already described in Fig. 1.

In this case, since the brush is used for a commutator, there will tend to be uneven distribution of current at brush faces depending on brush position, use of interpoles, strength of same, use of compensations, field windings, etc. This tendency to current concentration may be compensated for by using a higher resistance material in the section 17 than in the section 15, or, if desired, an external resistance may be used as shown diagrammatically in Fig. 11.

I have found that sectional brushes of this type are of especial value in alternating current traction motors, or other commutating alternating current machines. The design of such machines is, to a very large extent, limited by the "brush voltage"—a voltage generated in the armature coils connected to the commutator bars spanned by the brush. The effect of short circuiting this voltage through the brush is somewhat analogous to that of a short circuited coil on a transformer. The use of the divided brush minimizes the short circuiting currents in the face of the brush by introducing the relatively high contact drop between the adjacent sections and thus forcing the flow of current between a bar contacted by one section and that contacted by another to flow longitudinally through both sections of the brush and their lead-in connectors or pressure plate, etc. The resistance thus introduced into the circuit between the coils goes far to correct the effect of the short circuited coils and this can be further controlled by introducing additional resistance, e. g., as suggested above, either into the brush section itself or into its connection external to the brush. This reduction of the cross currents at the surface of the brush also serves to reduce the heating at the surface of the brush adjacent the commutator or other sliding contact surface and thus makes possible larger input.

The contact drop between the brush sections may, of course, be much higher than that occurring at the commutator both because of the nature of the materials concerned and because of the fact that there is little or no pressure exerted between the brush sections at this surface.

It will be observed particularly in Figs. 1, 2 and 3 that a relatively wide and shallow channel 25 has been provided between the adjacent brush sections. This may be, for example, about $\frac{1}{32}''$ deep and leave $\frac{1}{8}''$ to $\frac{3}{16}''$ at each side to contact with the adjacent brush. Inasmuch as this channel reduces the area of contact between the two brush sections it also tends to control the possibility of the current flow between them such as would be necessary if a short circuiting flow were to occur in the face of the brush; and expecially to concentrate near the cool outer edges of the brush any current flow which might occur. More important functions of this channel, however, are preventing the accumulation of pressure or vacuum between the brush and the sliding contact surface which would occur if one-piece solid brushes were used and also for the purposes of ventilating through the brush and to provide for the escape of small particles which might otherwise work themselves between the adjacent brush sections and, by becoming lodged in both sections, tend to hold the two together and to restrict the relative movement between them. By the use of a channelled form as shown in Figs. 1 to 3 inclusive the individual action of the brushes is improved.

Although I have shown in Figs. 1 to 4 inclusive a common type of brush fitting with a simple hammer plate it is to be understood, of course, that my invention may be used with suitable fittings for any of the many brush operating devices. I have indicated several such fittings, as examples, in Figs. 5 to 8 inclusive.

In Fig. 5 one of the brush sections 15b is provided with an angular hammer plate or clip 18b substantially the same as that shown in Fig. 1. The other section 17b is provided in a similar manner with a lifting clip 26 which extends laterally beyond the brush to be engaged by any type of lifting device. As will be obvious to those skilled in the art the hammer plate 18b, since it extends over the section 17b, serves to distribute pressure between the two sections when it is under pressure from the hammer spring (not shown); and, when a lifting pressure is exerted on the lifting clip 26, the hammer plate 18b is engaged by the section 17b and thus transmits the lifting force to the section 15b so that both sections are lifted as a unit.

Obviously, the lifting clip 26 may be positioned with its extended portion above or below the top of the brush section 17b and may be long or short, wide or narrow, all as may be required by the particular apparatus for which it is intended; or the lifting clip 26 instead of being extended away from the section 17b may be extended over and spaced from the top of the brush.

In Fig. 6, I have shown a structure in which the hammer plate and lifting clip are combined, the lifting clip in this case being extended back over the top of the brush somewhat as suggested at the end of the previous paragraph. In this case the clip 26c is integral with the hammer plate 18c and is riveted as shown to the section 15c. The rivet 19c in this case, however, is provided with a relatively large head which extends through a somewhat larger hole 21c in the section 17c. The clearance between the rivet head and the hole 21c provides for flexibility of movement between the two sections, whereas, the engagement of the rivet head with the brush section 17c at the sides of the hole provides for lifting of the section 17c together with the section 15c as a unit.

As will be readily understood by those skilled in the art, the form of the hammer clip may be widely varied in accordance with the design required by the particular type of apparatus with which the brush is to be used. Thus, for example, a bail may be secured to the plate 18 or the plate may be made U-shaped with provision of holes, as is common in lifting clips for certain existing apparatus, or it may be made in any of numerous other forms.

In Fig. 7, I have shown another type of combined lifting clip and hammer plate which may take the place of those shown in Fig. 5. In this case, instead of securing the hammer plate to one section and the lifting clip to the other section, an integrally combined hammer plate and lifting clip is made by riveting or spot welding the flat hammer plate 18d to the angular clip 26d and the latter is then secured to the section 15d by means of a large headed rivet 19d which engages the section 17d substantially as shown, and as already described in connection with Fig. 6.

In Fig. 8 is shown a lifting clip 26e secured to a hammer plate 18e, e. g., by spot welding or riveting, the former to the top of the latter. Although obviously, the connection might also be in other position on the latter. In this case the hammer plate 18e is fitted over the top of both sections and engages both sections with sufficient clearance in the holes 21e to provide the desired flexibility of movement between the respective sections 15e and 17e. In this case shallow knobs 27 have been pressed into the hammer plate to provide for limited rocking between the hammer plate and the respective sections 15e and 17e so that the limited movement between the two may take place with a more uniform action. It will be understood, however, that these are not necesary and that the hammer plate may be flat in this case as in the other cases illustrated. The particular form shown permits the use of a more rigid material for the hammer plate since the relative movement can occur entirely without flexing of the hammer plate itself.

In Fig. 9, I have shown by way of illustration another plate of a different but simple type of construction which can be used with an ordinary hammer spring. The brush, in this case is designed to be held more closely together as a unitary structure. The hammer plate 18f is made in a T-form and is positioned, as shown, in complementary slots between the adjacent sections 15f and 17f. This plate is loosely riveted to the section 15f by the rivet 19f, as shown; and advantageously a limited clearance is provided in the hole through which this rivet passes, so that a small amount of relative movement can be had between the section 15f and the hammer plate 18f. The head of the rivet 19f is enlarged as shown and is received in a hole 21f in the section 17f so that it engages the latter but allows a substantial clearance for limited movement of the section 17f relative to the hammer plate and the rivet. The rivet 19f in this case is provided with an enlarged flange at its end which engages in the enlarged recess of the hole 21f to hold the section 17f secured to the other part of the unitary structure.

Obviously with this construction operation is substantially the same as that described in connection with Figs. 1 and 4; and, if a lifting clip is secured to the hammer plate, its operation will be substantially as described in connection with Figs. 6 and 7.

It is an advantage of this and the other forms of hammer clips as shown in the drawings that they require all sections to wear at substantially the same rate and retain positively and at all times the angular position of the hammer plates so that the action under the hammer spring remains as designed for the particular apparatus. It is very important that these angular relationships should be kept at all times during operation, and I have found that this rigid or near rigid attachment of the hammer plate is a very simple and satisfactory expedient for this purpose. Such a plate is ordinarily connected rigidly only to one section, but this is for simplicity and economy. If there is provision for some flexibility of movement either in the plate itself or in the connection, more than one or all of the sections may be connected to the hammer plate or other connecting means. Nevertheless, it is not essential that this hammer plate or other pressure distributing means should be rigid to this extent; and I have used, for example, hammer plates hinged to the respective sections so that they are free to move to a substantial angle. As already stated, however, it is important, if such a flexible construction should be used, that the other factors in the design of the brush be chosen so that the several sections will wear uniformly. I have found it simpler, however, and more satisfactory to use the more positive control by designing the pressure distributing member to maintain a substantially predetermined angle and, thereby enforce a uniform wear among the several sections.

It is not even essential that the hammer plate or other pressure distributing member should be secured to any section of the brush. It may be separable or secured to or a part of the hammer spring or slidably to the brush box, and may be held in the desired angular relation in any convenient way.

I have already mentioned the longitudinal recess or channel 25 shown in Figs. 1 to 3 inclusive and it will be understood that channelling may be used in any of the types of brushes embodying my invention, although, for the sake of simplicity, it has not been shown in connection with other figures described above. It should be understood also that this channel may take numerous other forms, and in Fig. 10 I have shown by way of example a two section brush in which the adjacent faces of the respective sections are diagonally channelled thus producing channels which run from the contact face of the brush longitudinally across the adjacent faces to the other end of the brush.

It has been demonstrated that a brush operating on a rotating contact surface develops air pressure or vacuum beneath the brush, depending upon the design, speed of rotation, etc., and that the contact drop between the brush and the sliding surface depends to a considerable extent upon the air pressure or vacuum thus built up beneath the brush. A number of expedients have already been suggested to cure this condition. I have found that by thus providing channels between the sectional brushes a substantially improved contact is obtained and that this is particularly important in these sectional brushes because it allows the several sections of the brush to operate more perfectly without regard to the distribution of the air pressure or vacuum thus built up beneath the brush.

In Fig. 10, I have shown also a helically grooved rotating contact surface combined with such a channeled brush. I have found that this combination is particularly desirable because it allows a flow of air through the brush and provides also for the carrying away of any particles which might otherwise work up between the brush sections or between a brush section and the rotating contact surface.

I have found that the frequency with which these grooves pass a given point on the brush is an important factor in their operation and consequently, with lower speed apparatus, I find it advantageous to use multiple threads, i. e., a plurality of grooves running in parallel helical paths. For example, a slip ring for a. c. generators operating at 1800 R. P. M. might be provided with a single helical groove having about ⅜" pitch. A ring designed to operate at 900 R. P. M. might be provided with two grooves equally spaced and each having a ¾" pitch so that the space between grooves remains ⅜ of an inch, but the frequency with which they pass a given point is equal to that of the ⅜" single groove operating at double the speed. A ring designed to operate at 450 R. P. M. under similar conditions might be provided with four grooves equally spaced and each having a 1½" pitch. In general a frequency of at least twenty times per second has been found very satisfactory.

Also instead of keeping the relatively wide spacing between the grooves, the grooves may be brought closer together in order to increase the duration of passage of grooves beneath a given point, so long as the grooves are wide enough to carry off loose particles, to conduct the required ventilating air and to give time enough for cooling any overheated spot on the brush while the groove is moving across it. I have found that this type of commutator may be made much more cheaply and efficiently than the ordinary commutator. It is customary in making such commutators first to machine them with a rough cut, follow this by a fine cut and then by a polish cut, then with a filing operation, next with an emery grinding and finally with an oak block polishing operation. I make such grooved type of commutators by forming a super rough cut as the first machining operation. This rough cut will amount essentially to the cutting of a thread, e. g., not more than about 20 threads per inch, and several or all of the intermediate machining operations may be eliminated by merely polishing or honing off the edges of the sharp thread. Because of the relatively narrow surface on the top of these threads and because of the screw conveyor action which tends to keep the surface of the polishing block clean, this operation may be readily and efficiently performed and the resulting commutator, although much more cheaply manufactured will be in many respects superior to those which are made by the more costly process.

Notwithstanding that such grooving tends to reduce the contact area of the sliding contact surface, my experience indicates that there is actually an increase in the effective contact between the brush and the sliding contact surface. This is probably partly because of the more perfect surface which is maintained by the scraping or screw conveyor action already described and partly by the elimination of air pressure from beneath the brush, so that the brush and the sliding surface can come into direct contact instead of being separated by a thin film of compressed air.

Although for the sake of simplicity I have shown in most of the drawings a brush consisting of only two sections it should be understood that my invention relates to multiple sections and the number which is chosen will depend primarily upon the design of the apparatus in which the brush is to be used and upon the conditions of operation. Instead of two sections three or four or even more sections may be used in substantially the same way and the adjacent faces of these sections or one of them may be longitudinally channelled substantially as already described. The pressure distributing clip may be designed, e. g., with spring means of limited scope beneath the hammer plate to exert a pressure on all sections at all times. I have found, however, that even with the simple form of hammer clips shown in Fig. 1 and with more than two sections a satisfactory result is obtained.

Although I have shown the in-lead connections as pig-tail shunts of the cemented type, it will be understood that this is just one of various types of connections which are in common use and that any connection which may be desirable from other points of view may be used in connection with my invention. It is an important feature of my invention, however, that each of the brush sections which is intended to carry current to the sliding contact surface should be provided with individual current lead-in connection, whereas sections of the brush which serve functions such as lubricating or which provide an abrasive action are not provided with current connections and, therefore, are not subject to heating and other conditions which might tend to be destructive of the special materials used in their composition.

By the expedients and structures set forth above I have provided a novel sectional but unitary electrical brush which is distinguished from the single brushes heretofore in common use and from slotted brushes and from laminated brushes by the fact that its several sections may contact independently with the commutator, collector or other contacting device, whereby the area of contact is increased and the continuity of contact is very greatly improved. The fact that there are several sections results in one of these sections being at all times in contact and thus correcting the fluctuations of contact which are unavoidable with single brushes. The division of the curved face of the brush into a plurality of sections results in a closer conformity of the brush face to the moving contact face, when substantial differential expansion or contraction occurs, or wear away from the contour of the sliding contact surface. The division of the brush into separate sections which are not pressed laterally together introduces a high contact drop between them and thereby reduces any tendency to cross currents in the face of the brush, which otherwise would tend to produce excessive heating at the contact surface. This brush is also distinguished from other multiple brushes by the fact that these several sections are interconnected, in mechanical contact with one another and acted upon by a common pressing means, which has resulted in correcting any tendency of separate sections to "bob", "chatter" or vibrate excessively during operation. The provision of longitudinal channels especially in combination with helical grooving of the rotating contact surface further corrects any tendency toward overheating and provides for cleaning away particles which otherwise might interfere with the operation of the brush sections.

In short with brushes embodying my invention commutation is improved, the brushes wear longer and more uniformly and in addition all of the advantages of laminated and multiple brushes are attained, while the cost remains only slightly greater than that of the ordinary single brushes and the sectional unit is interchangeable with single brushes so that no further additional cost in the apparatus is required.

What I claim is:

1. A sectional contact brush for sliding electrical contact devices, which comprises a plurality of longitudinal sections arranged side-by-side with their adjacent surface transverse to the direction of movement of the sliding contact, and a clip secured to the leading section of the brush near its end fartherest from the contact face and having a stiffly resilient portion extended over the corresponding end of an adjacent section adapted to exert pressure longitudinally thereon, to yield resiliently to vibrations caused by normally occurring irregularities in the sliding surface of the contact device, but to keep said sections substantially abreast by reducing the pressure on the shorter section whenever one section wears more rapidly.

2. A sectional contact brush for sliding electrical contact devices, which comprises a plurality of longitudinal brush sections in side-by-side arrangement with their adjacent surfaces transverse to the direction of movement of the sliding contact, an extension secured to one of said sections extended laterally for engagement with another whereby pressure upon the former may be transmitted to the latter for holding both against a contact surface but said extension and its engagement with the second-named section being adapted to accommodate relative longitudinal movement between said sections.

3. A sectional contact brush for sliding electrical contact devices, which comprises a plurality of longitudinal brush sections in side-by-side arrangement with their adjacent surfaces transverse to the direction of movement of the sliding contact, a hammer plate secured to the back of at least one section and extended over the back of the adjacent section and adapted to transmit pressure toward the contact face directly upon the section to which it is attached and with limited flexibility to the adjacent section whereby to accommodate longitudinal movement between sections resulting from irregularities in the contact surface moving under first one section and then the other.

4. A sectional contact brush for sliding electrical contact devices, which comprises a plurality of longitudinal brush sections arranged side-by-side along the direction of movement of the sliding contact and with their adjacent surfaces transverse to said direction of movement and movable with respect to one another, a pressure distributing member extended over the end of said sections opposite to their contact faces and having limited flexibility to accommodate relative longitudinal movement between said sections but adapted to reduce substantially the proportion of the total pressure which is exerted upon any section when it is moved ahead of the others.

5. A sectional brush unit for sliding electrical contact devices, which comprises a plurality of brush sections in side-by-side arrangement with their adjacent surfaces transverse to the direction of movement of the sliding contact and movable with respect to one another, a current lead connection for each of a plurality of said sections, a pressure distributing member adapted to engage said sections and distribute among them pressure applied thereto, and means for mechanically connecting said sections into a permanent unit, said means being adapted to accommodate limited longitudinal movement between the brushes.

6. A sectional brush for sliding electrical contact devices, which comprises a plurality of sections in side-by-side arrangement with their adjacent surfaces transverse to the direction of movement of the sliding contact, at least two of said sections being electrically connected for conducting current to the sliding contact device and another section between them not being directly connected into the circuit and carrying substantially no current.

7. A sectional brush as defined in claim 6, in which the last-named brush section comprises a lubricating material.

8. A sectional brush as defined in claim 6, in which the last-named brush section comprises abrasive material.

9. A sectional brush as defined in claim 6, which includes means for engaging the last-named brush section mechanically with at least one of the other brush sections whereby they may be pressed into and withdrawn from operating position as a unit, but said engaging means being adapted to allow limited freedom of one of said brush sections to move relative to the other, whereby individually to follow any irregularities in the sliding contact device.

10. A sectional brush for sliding electrical contact devices, which comprises a plurality of sections in side-by-side arrangement with their adjacent surfaces transverse to the direction of movement of the sliding contact and movable with respect to one another, a plurality of which are of respectively different composition adapted to give approximately uniform wear under their respective conditions of operation and are connected into a circuit for conducting current to the sliding contact device, and means for distributing pressure from a common source to the several sections.

11. A sectional brush unit for sliding electrical contact devices, which comprises a plurality of brush sections in side-by-side arrangement with their adjacent surfaces transverse to the direction of movement of the sliding contact, a current lead connection for each of a plurality of said sections, a pressure distributing member adapted to engage said sections and distribute among them pressure applied thereto, means for lifting said brush in a direction opposite to the pressure normally exerted by said pressure distributing member, in which the pressure distributing member is secured to at least one section and extends over the remaining section or sections, the means for lifting the brush is secured to at least one section and the unit includes means mechanically connecting the sections, whereby all may be lifted as a unit by said lifting means, but with limited flexibility for relative movement between them when the device is in operation.

12. A sectional brush unit for sliding electrical contact devices, which comprises a plurality of brush sections in side-by-side arrangement with their adjacent surfaces transverse to the direction of movement of the sliding contact, a current lead connection for each of a plurality of said sections, a pressure distributing member adapted to engage said sections and distribute among them pressure applied thereto with limited flexibility for longitudinal movement therebetween, and at least one of said sections being channelled longitudinally on its side adjacent another section.

13. A sectional brush unit for sliding electrical contact devices, which comprises a plurality of brush sections in side-by-side arrangement with their adjacent surfaces transverse to the direction of movement of the sliding contact, a current lead connection for each of a plurality of said sections, a pressure distributing member adapted to engage said sections and distribute among them pressure applied thereto with limited flexibility for longitudinal movement therebetween, and at least one of said sections having a shallow longitudinal channel over a major part of the area of its side adjacent another section.

14. In an electrical apparatus, the combination of a rotating sliding contact device having its contact surface helically grooved at a pitch such that during operation a groove passes any given point adjacent said surface at least twenty times per second, a sectional contact brush having one face in contact with said sliding contact device and comprising a plurality of sections in side-by-side arrangement at least one of which is longitudinally channelled on its side adjacent another section whereby to provide, in conjunction with said helical grooves, for passage of air under and through said brush.

15. A composite brush comprising a plurality of separate parallel sections arranged along the direction of movement with their adjacent surfaces transverse to the direction of movement of the sliding contact, and means mechanically connecting said sections into a unit but with limited flexibility of movement therebetween in either longitudinal direction, said means including a lifting clip.

16. A current collecting brush for rotating contact in electrical machinery which comprises a plurality of relatively movable brush sections positioned one beyond the other in the direction of rotation, a common brush box in which said sections are slidably received by which they are positioned in predetermined angular relation to the axis and radius of a rotating contact, means common to said sections for pressing them against said rotating contact and means for distributing the pressure of said pressing means among said sections adapted to accommodate limited movement between the sections but to give approximately the same angular distribution of pressure throughout the normal wear of the brush.

WILLIAM SIEBENMORGEN.